(12) United States Patent
Huang et al.

(10) Patent No.: US 11,976,449 B2
(45) Date of Patent: May 7, 2024

(54) SENSING FAUCET ASSEMBLY

(71) Applicant: Beijing Kohler Ltd., Beijing (CN)

(72) Inventors: Jiagao Huang, Beijing (CN); Peng Zhang, Beijing (CN)

(73) Assignee: KOHLER CO., Kohler, WI (US)

( * ) Notice: Subject to any disclaimer, the term of this patent is extended or adjusted under 35 U.S.C. 154(b) by 228 days.

(21) Appl. No.: 17/582,736

(22) Filed: Jan. 24, 2022

(65) Prior Publication Data

US 2022/0243438 A1 Aug. 4, 2022

(30) Foreign Application Priority Data

Feb. 4, 2021 (CN) .......................... 202120328089.X

(51) Int. Cl.
*E03C 1/05* (2006.01)
*C02F 1/00* (2023.01)
*F16K 31/60* (2006.01)

(52) U.S. Cl.
CPC .............. *E03C 1/057* (2013.01); *C02F 1/003* (2013.01); *F16K 31/605* (2013.01); *C02F 2201/005* (2013.01); *C02F 2307/06* (2013.01); *E03C 2201/40* (2013.01)

(58) Field of Classification Search
CPC ...... E03C 1/057; E03C 2201/40; C02F 1/003; C02F 2201/005; C02F 2307/06; C02F 2303/24; F16K 31/605

USPC ............................ 4/676, 675, 677–678, 567
See application file for complete search history.

(56) References Cited

U.S. PATENT DOCUMENTS

| | | | |
|---|---|---|---|
| 2015/0251922 A1* | 9/2015 | Schuster | ................ C02F 1/008 210/323.1 |
| 2020/0048109 A1* | 2/2020 | Schuster | ................... C02F 9/20 |

FOREIGN PATENT DOCUMENTS

| | | | | |
|---|---|---|---|---|
| CA | 2902645 A1 | * | 7/2016 | .......... B01D 29/603 |
| CN | 104436828 A | * | 3/2015 | .......... B01D 37/043 |
| TW | 474094 U | * | 3/2014 | ............. B01D 29/62 |
| WO | WO-2022075569 A1 | * | 4/2022 | ........... E03C 1/0404 |

* cited by examiner

*Primary Examiner* — Lori L Baker
(74) *Attorney, Agent, or Firm* — FOLEY & LARDNER LLP

(57) ABSTRACT

A sensing faucet assembly includes a faucet body, an input water control unit, a control box, and a sensor. The faucet body includes a faucet water passage. The control box includes a first water passage and a second water passage. The input water control unit includes a water inlet, a first water outlet, and a second water outlet. The first water passage communicates with the faucet water passage and the first water outlet, and the control box is equipped with a solenoid valve. The second water passage communicates with the faucet water passage and the second water outlet, and the input water control unit is provided with a valve core for controlling the communication and the blocking of the second water outlet.

9 Claims, 7 Drawing Sheets

SENSING FAUCET ASSEMBLY

CROSS-REFERENCE TO RELATED PATENT APPLICATIONS

This application claims the benefit and priority to Chinese Patent Application No. 202120328089.X, filed Feb. 4, 2021, the entire disclosure of which is hereby incorporated by reference herein.

TECHNICAL FIELD

The present disclosure relates to the technical field of faucet, and more particularly, to a sensing faucet assembly.

BACKGROUND

In the sanitary industry, more and more faucets employ sensing technology to control water discharge. Sensing faucets are common water-saving sanitary products at present, which, as water output device, can effectively prevent cross-infection of germs on hands since no direct touch with hand is required.

A common sensing faucet comprises a faucet body and a control box, which can only control discharge of water through sensing. However, if a part such as a solenoid valve breaks down, the faucet cannot operate normally. Accordingly, performance of sensing faucets still need to be improved.

SUMMARY

The present disclosure relates to a sensing faucet assembly, which can discharge water through a second water passage when a solenoid valve or the like breaks down water passage, so as to improve the performance of product.

The present disclosure relates to a sensing faucet assembly, which includes a faucet body, an input water control unit, a control box and a sensor. The faucet body includes a faucet water passage. The control box includes a first water passage and a second water passage. The input water control unit includes a water inlet, a first water outlet, and a second water outlet. The first water passage communicates the faucet water passage and the first water outlet, and a solenoid valve for controlling the opening and closing of the first water passage is provided in the control box. The second water passage communicates the faucet water passage and the second water outlet, and a valve core for controlling the opening and closing of the second water outlet is provided in the input water control unit.

In some embodiments, a filter screen is provided in the first water passage; and the filter screen is located between the solenoid valve and the first water outlet.

In some embodiments, the input water control unit includes a control unit housing with a mounting cavity; the water inlet, the first water outlet, and the second water outlet are provided on the control unit housing, respectively; the valve core is movably arranged in the mounting cavity and can open and close the second water outlet; a handle for driving the valve core to move in the mounting cavity is arranged outside of the control unit housing; and the handle is connected with the valve core.

In some embodiments, the faucet body includes a panel, and the sensor is installed on the panel.

In some embodiments, the handle and the faucet body are located on the front side of the panel, and the control unit housing and the control box are located on the rear side of the panel.

In some embodiments, the control box is equipped with a battery, and the battery is electrically connected to the solenoid valve.

In some embodiments, the control box includes a main water passage communicating with the faucet water passage; and the first water passage and the second water passage are communicated with the main water passage, respectively.

In some embodiments, the water inlet includes a cold water inlet and a hot water inlet.

In some embodiments, the first water outlet is kept in communication with the water inlet, and the valve core controls the communication and the blocking between the second water outlet and the water inlet.

The sensing faucet assembly is equipped with the first water passage, the second water passage and the valve core that controls the communication and the blocking of the second water passage. When the solenoid valve or the like breaks down and water cannot be supplied from the first water passage, water can be supplied to the faucet body through the second water passage, such that the product can continue to work, and the performance of the product is improved.

DETAILED DESCRIPTION

Figure 1:
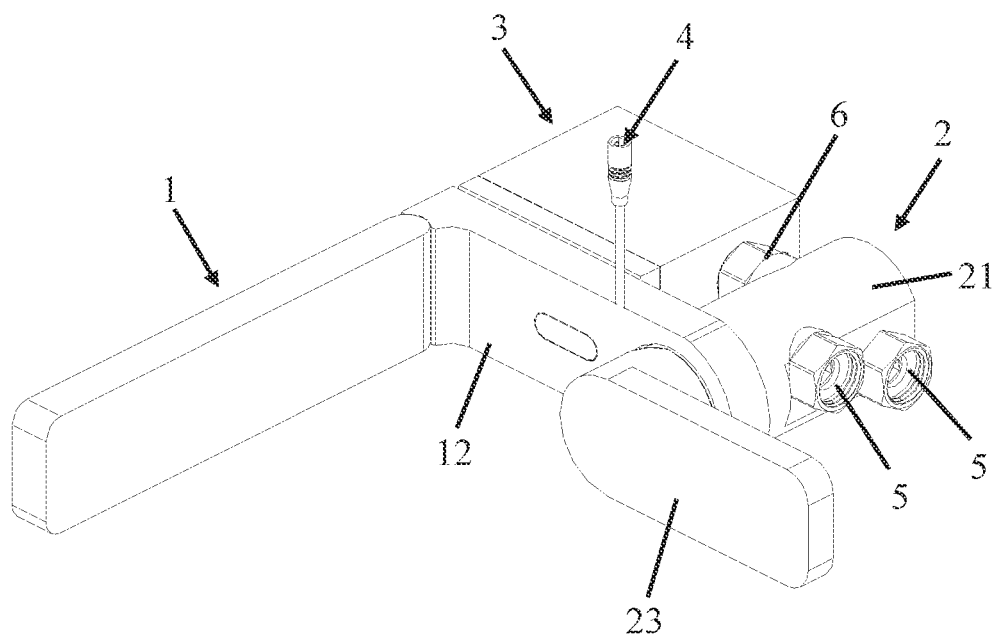
FIG. 1 is a perspective view of a sensing faucet assembly according to an embodiment of the present disclosure.

The detailed embodiments of the present disclosure will be further described by reference to the accompanying drawings hereinafter. Like reference numerals refer to like elements. It should be noted that the terms of "front", "back", "left", "right", "up", and "down" used in the following description refer to the directions in the accompanying drawings, and the terms of "inner" and "outer" refer to the directions towards or away from the geometric center of a specific component, respectively.

FIGS. 1-8 depict a sensing faucet assembly according to an embodiment, which includes a faucet body 1, an input water control unit 2, a control box 3 and a sensor 4.

The faucet body 1 has a faucet water passage 11. The control box 3 has a first water passage 322 and a second water passage 323.

The input water control unit 2 has a water inlet 211, a first water outlet 212 and a second water outlet 213.

The first water passage 322 communicates with the faucet water passage 11 and the first water outlet 212. The control box 3 includes a solenoid valve 33 for controlling the opening and closing of the first water passage 322. The second water passage 323 communicates with the faucet water passage 11 and the second water outlet 213. A valve core 22 for controlling the opening and closing of the second water outlet 213 is provided in the input water control unit 2.

The sensing faucet assembly includes the faucet body 1, the input water control unit 2, the control box 3 and the sensor 4.

The control box 3 may be embedded into a wall, and the faucet body 1 is at least partially located outside the wall. The sensor 4 may be installed on the faucet body 1, or in the wall, or on the control box 3. The sensing unit 41 of the sensor 4 is at least partially left outside for monitoring the distance between the faucet body 1 and a human body, a hand, or an object to be washed. The sensor 4 may be any sensor known in the art, and its working principle will not be described in detail herein.

The faucet water passage 11 is provided in the faucet body 1, and communicates with the spout of the faucet body 1.

The control box 3 includes a box body 31 and a water passage main body 32 installed in the box body 31. In the water passage main body 32, there are the first water passage 322 and the second water passage 323. The box body 31 has a cavity 311 therein, and the water passage main body 32 is installed in the cavity 311. The box body 31 has a first opening 312 and a second opening 313 at the end close to the input water control unit 2. The pipe of the first water passage 322 passes through the first opening 312, and the pipe of the second water passage 323 passes through the second opening 313.

The faucet body 1 and the control box 3 are assembled together, and the first water passage 322 and the second water passage 323 are communicated with the faucet water passage 11, respectively.

A solenoid valve 33 is installed in the box body 31 to control the opening and closing of the first water passage 322. The sensor 4 is connected to the controller, and the controller may be integrated into the solenoid valve 33, or may be separately provided. The controller is connected to the solenoid valve 33 to control the opening and closing of the solenoid valve 33 in response to signals from the sensor 4. The solenoid valve 33 may be a solenoid valve known in the art, and its working principle will not be described in detail herein.

If desired, the solenoid valve 33 may also be connected to electric wires in the wall through conducting wires, or it may be powered by a battery.

The input water control unit 2 can also be referred to as a water mixing pipe, which has at least one water inlet 211 or water input channel. The water inlet 211 or the water input channel is equipped with a connecting valve 5 for connecting with a water input pipeline.

The input water control unit 2 is also provided with a first water outlet 212 or a first water output channel, and a connection valve 6 is installed on the first water outlet 212 or the first water output channel, for connecting with the pipe of the first water passage 322. Therefore, the first water passage 322 is connected between the faucet water passage 11 and the first water outlet 212.

The input water control unit 2 is also provided with a second water outlet 213 or a second water output channel, and a connection valve 6 is installed on the second water outlet 213 or the second water output channel, for connecting with the pipe of the second water passage 323. Therefore, the second water passage 323 is connected between the faucet water passage 11 and the second water outlet 213.

The valve core 22 is provided in the input water control unit 2, and controls the opening and closing of the second water outlet 213. The valve core 22 may be an automatic valve (for example, a solenoid valve), or a manual valve (for example, a handle-driven valve).

Suppose that the distance L between an object or person and the sensing unit 41 is less than or equal to $L_0$, i.e., $L \leq L_0$, the sensor 4 sends a signal to the controller, and the controller controls the solenoid valve 33 to open the first water passage 322. At this time, water enters into the faucet water passage 11 from the first water passage 322 and then is discharged through the spout of the faucet body 1; when the object or person leaves and the distance L from the sensor unit 41 is more than $L_0$, i.e., $L > L_0$, the sensor 4 sends a signal to the controller, and the controller controls the solenoid valve 33 to keep the first water passage 322 closed. At this time, no water is supplied from the first water passage 322 to the faucet water passage 11.

Figure 6:
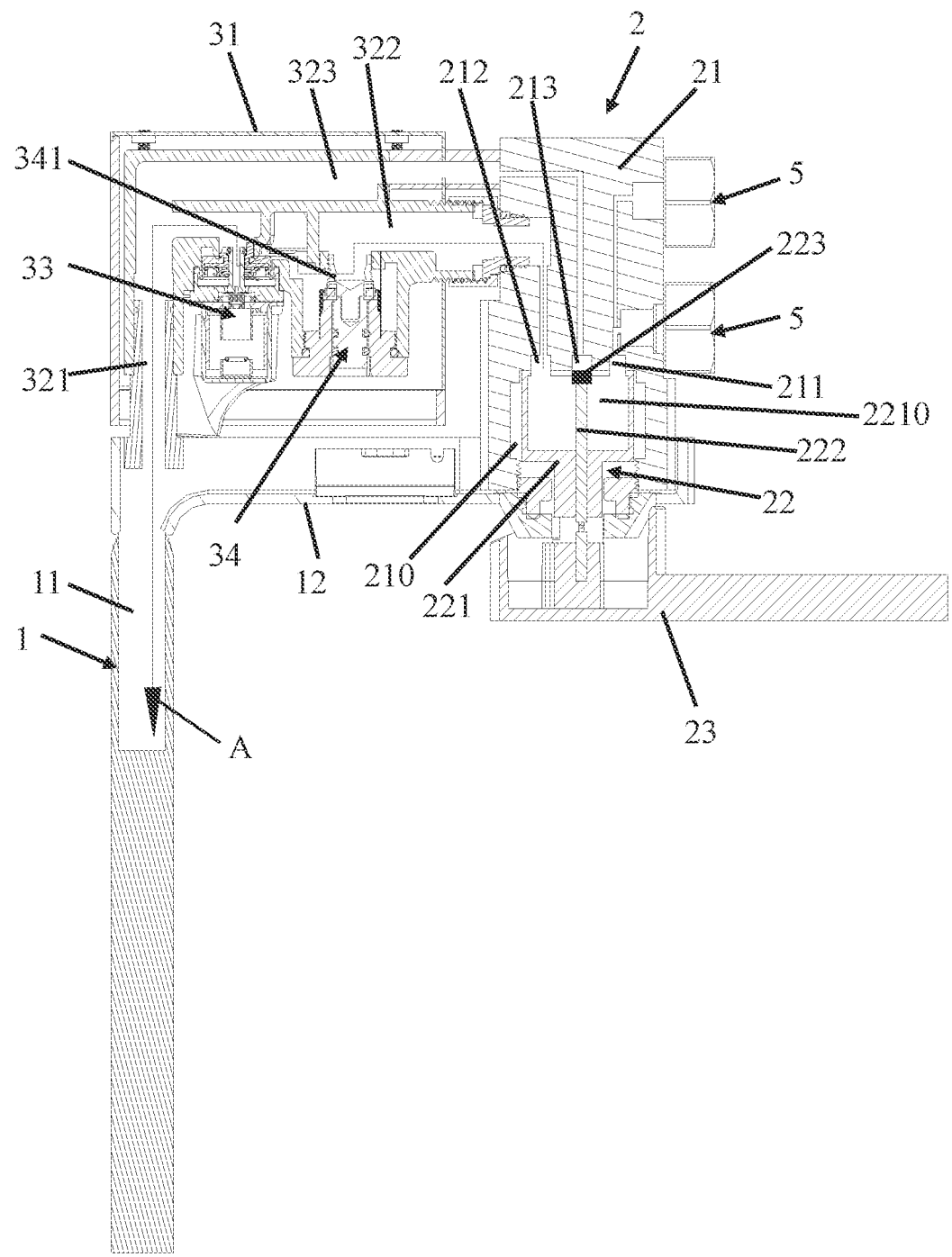
FIG. 6 is a schematic diagram which shows, when the second water outlet is closed, water is supplied to the faucet body through the first water passage alone.

During normal operating state, in one mode: external water enters into the first water passage 322 through the water inlet 211 and the first water outlet 212, the second water outlet 213 is kept closed, and water is supplied to the faucet water passage 11 mainly through the first water passage 322 in which the solenoid valve 33 is provided. As shown in FIG. 6, the water flows along the arrow A from the first water passage 322.

During normal operating state, in another mode: the valve core 22 is operated to open the second water outlet 213. A portion of the water entering from the water inlet 211 enters into the first water passage 322 through the first water outlet 212 and flows along the arrow A, and the other portion of the water enters into the second water passage 323 through the second water outlet 213 and flows along the arrow B. In this mode, both the first water passage 322 and the second water passage 323 supply water to the faucet water passage 11.

Figure 8:
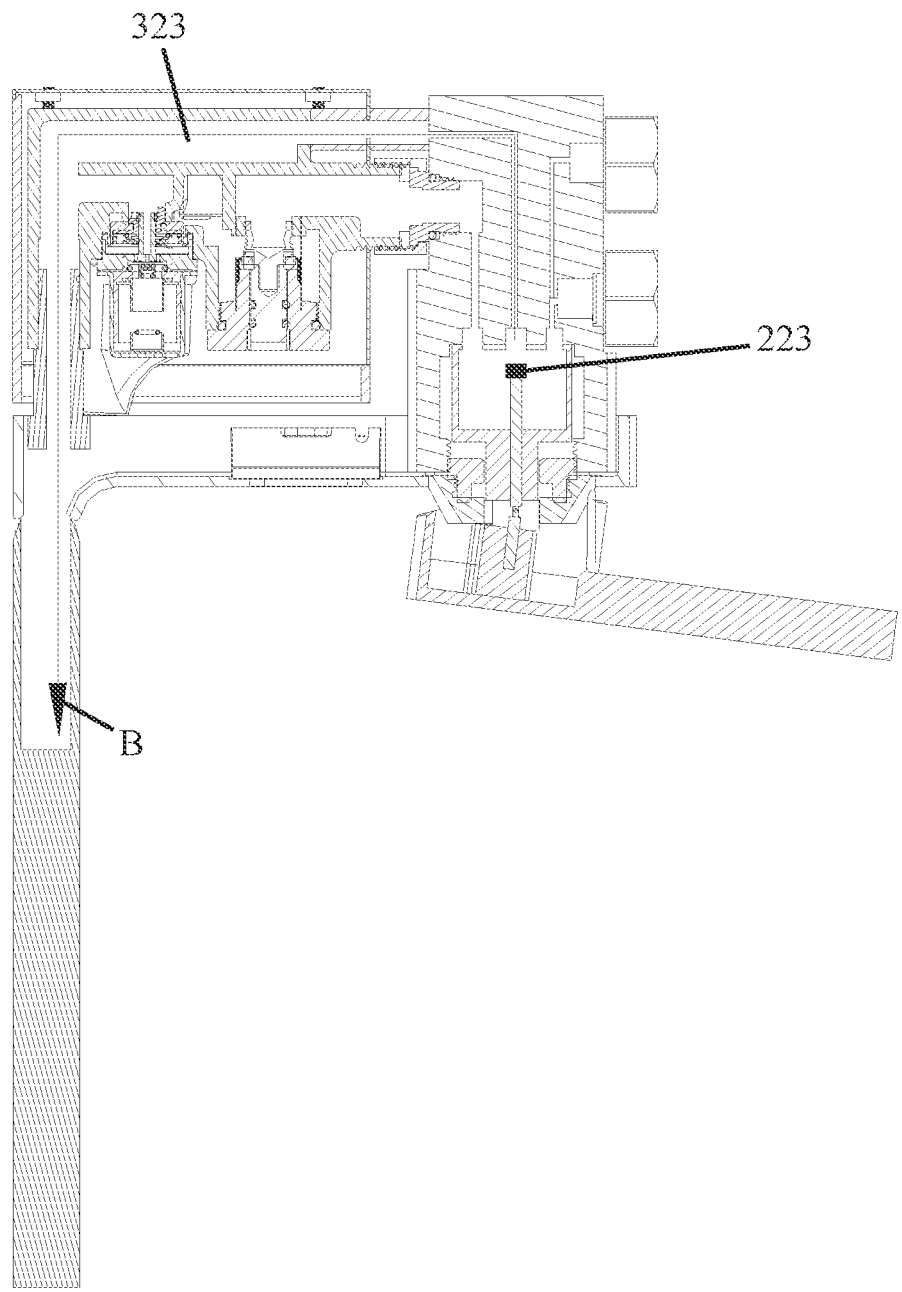
FIG. 8 is a schematic diagram which shows, when the second water outlet is opened, water is supplied to the faucet body through the second water passage alone.

When malfunction happens to the solenoid valve 33 or the first water passage 322 is blocked, the valve core 22 may be operated to open the second water outlet 213. Then, the external water enters into the second water passage 323 through the water inlet 211 and the second water outlet 213, and thus water is supplied by the second water passage 323 to the faucet water passage 11. As shown in FIG. 8, water flows along the arrow B from the second water passage 323.

Therefore, in the sensing faucet assembly, due to the first water passage 322, the second water passage 323, and the valve core 22 for controlling the opening and closing of the second water passage 323, when the solenoid valve 33 or the like breaks down and the first water passage 322 cannot continue to supply water, water can be supplied to the faucet water passage 11 through the second water passage 323, such that the product can continue to work and the performance thereof is improved.

Figure 4:
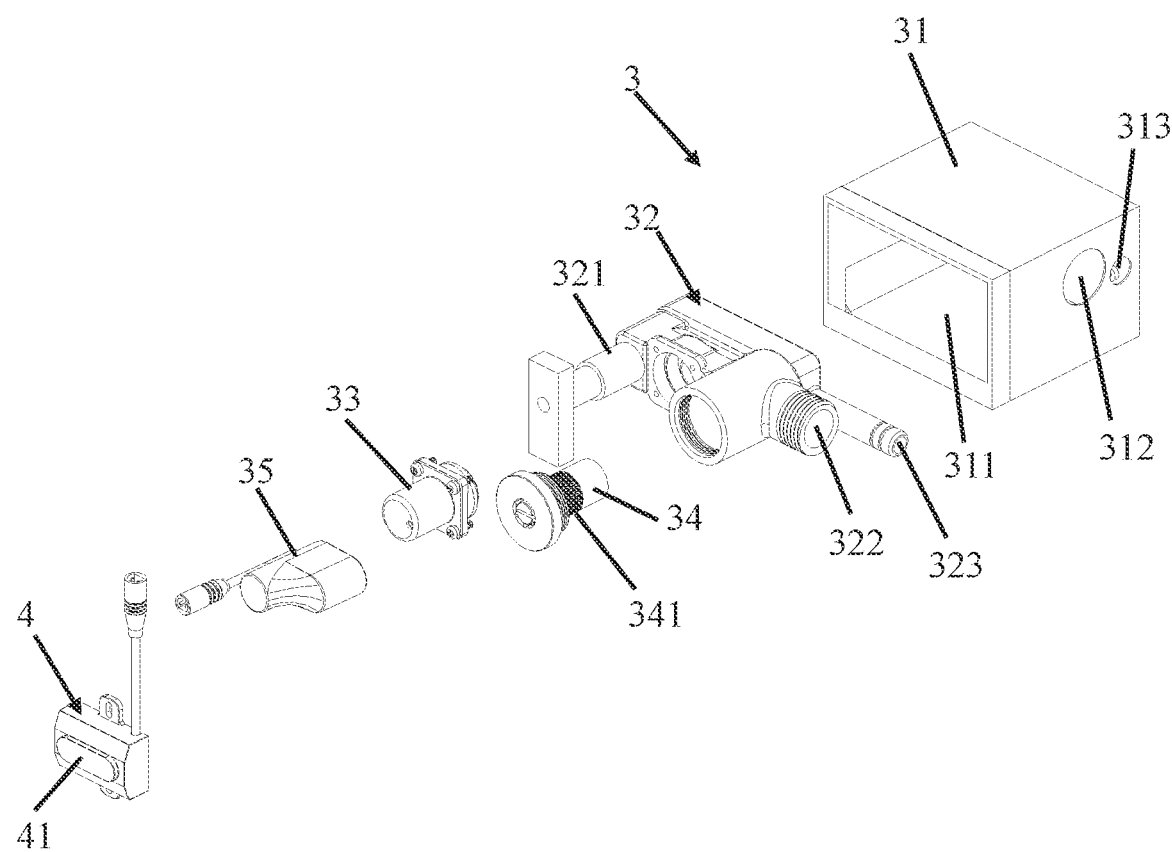
FIG. 4 is an exploded view of a control box and a sensor.
Figure 5:
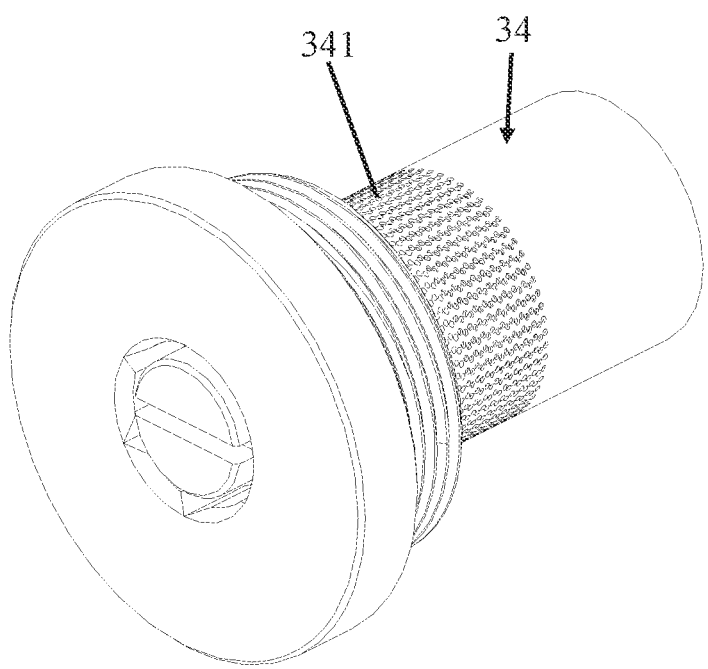
FIG. 5 is a perspective view of a filtering valve.

In some embodiments, as shown in FIGS. 4-6, a filter screen 341 is provided in the first water passage 322, and is located between the solenoid valve 33 and the first water outlet 212.

A filtering valve 34 is installed in the first water passage 322, and is at the upstream of the solenoid valve 33. The filtering valve 34 includes the filter screen 341, and the filter screen 341 may be constructed by a plurality of filter holes arranged on the filtering valve 34 to achieve the function of filtration.

In some embodiments, as shown in FIGS. 1-4 and 6, the input water control unit 2 includes a control unit housing 21 having a mounting cavity 210. The water inlet 211, the first water outlet 212 and the second water outlet 213 are provided on the control unit housing 21, respectively.

The valve core 22 is movably arranged in the mounting cavity 210 and can open and close the second water outlet 213.

A handle 23 for driving the valve core 22 to move in the mounting cavity 210 is arranged outside of the control unit housing 21. The handle 23 is connected with the valve core 22.

In some embodiments, the input water control unit 2 includes the control unit housing 21 having the mounting cavity 210.

The water inlet 211, the first water outlet 212 and the second water outlet 213 are respectively arranged on the baseplate of the mounting cavity 210, and locating holes are also provided in the baseplate of the mounting cavity 210 for locating and installing the valve core 22.

The valve core 22 is located in the mounting cavity 210 and can be actuated by the handle 23 so as to open and close the second water outlet 213.

The valve core 22 includes a valve housing 221, a valve stem 222 and a plug 223. The valve housing 221 has a cavity 2210. One end of the valve stem 222 is in the cavity 2210, on which the plug 223 is mounted, and the other end of the valve stem 222 extends out from the cavity 2210 and is hinged with the handle 23. Communication holes are provided in the bottom of the cavity 2210 at the positions corresponding to the water inlet 211, the first water outlet 212, and the second water outlet 213, respectively. Water can enter the cavity 2210 through the water inlet 211, and then flow out from the first water outlet 212 and the second water outlet 213 through the cavity 2210.

The valve stem 222 is slidably connected with the valve housing 221, and the valve stem 222 can move linearly with respect to the valve housing 221. As shown in FIG. 6, when the handle 23 is pressed down, the valve stem 222 drives the plug 223 to block the second water outlet 213. At this time, water in the cavity 2210 enters into the first water passage 322 through the first water outlet 212.

Figure 7:
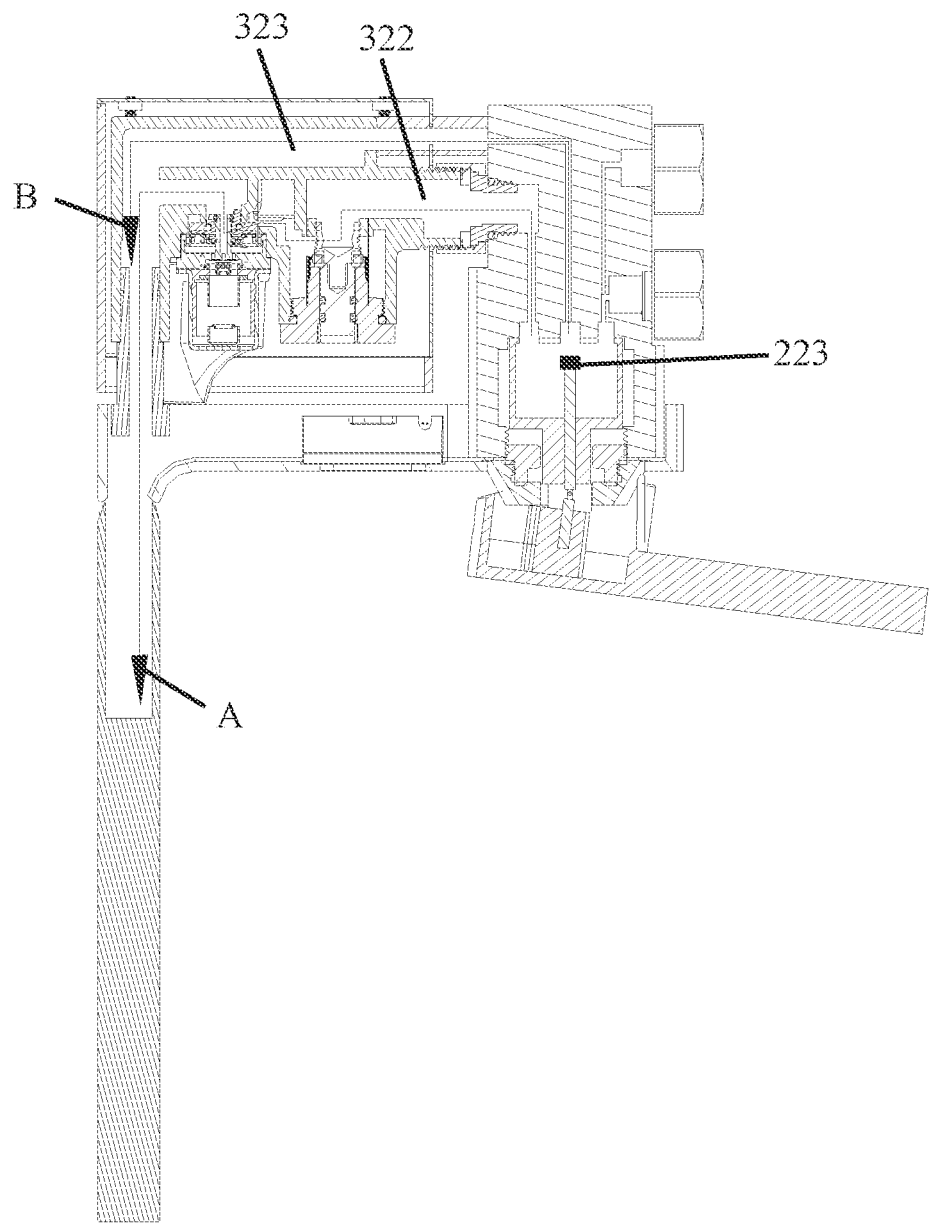
FIG. 7 is a schematic diagram which shows, when the second water outlet is opened, water is supplied to the faucet body through both the first water passage and the second water passage.

As shown in FIGS. 7-8, when the handle 23 is raised up, the valve stem 222 drives the plug 223 to leave the second water outlet 213. At this time, water in the cavity 2210 can enter the second water passage 323 through the second water outlet 213.

Figure 2:
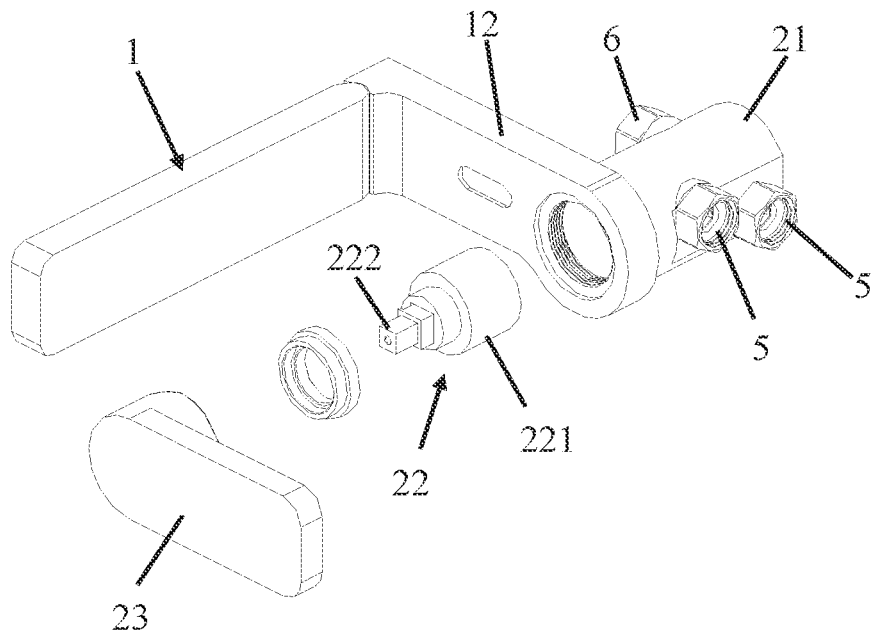
FIG. 2 is an exploded view of an input water control unit.
Figure 3:
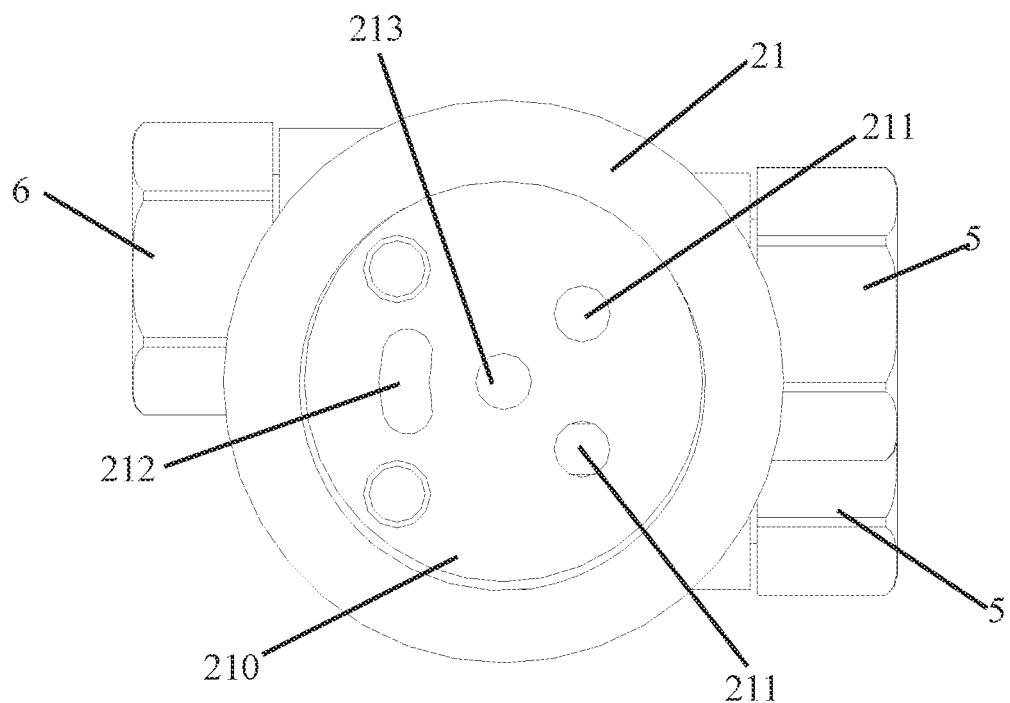
FIG. 3 is a schematic diagram of the input water control unit, which shows the housing of the input water control unit has a mounting cavity, a water inlet, a first water outlet, a second water outlet and a locating hole.

In some embodiments, as shown in FIGS. 1-2 and 6, the faucet body 1 includes a panel 12 on which the sensor 4 is installed. The panel 12 is provided with a through hole at the position corresponding to the sensing unit 41, and the sensing unit 41 is located within the panel 12 or at the rear side of the panel 12, so as to avoid it from being damaged by external objects.

In some embodiments, as shown in FIGS. 1-2 and 6, the handle 23 and the faucet body 1 are located on the front side of the panel 12, and the control unit housing 21 and the control box 3 are located on the rear side of the panel 12. When the sensing faucet assembly is embedded in the wall, only the handle 23 and the faucet body 1 are left outside the wall, and the rest are all buried into the wall, which can help to improve the level of decoration.

In some embodiments, as shown in FIG. 4, the control box 3 is equipped with a battery 35, and the battery 35 is electrically connected to the solenoid valve 33. The battery 35 is connected to the solenoid valve 33 by conducting wires so as to supply power to the solenoid valve 33, and thus no wiring specially arranged in the wall is required, which is convenient for the installation.

In some embodiments, as shown in FIGS. 4 and 6, the control box 3 includes a main water passage 321 communicating with the faucet water passage 11. The first water passage 322 and the second water passage 323 are communicated with the main water passage 321, respectively.

In some embodiments, the main water passage 321 is provided at one side of the water passage main body 32, the first water passage 322 and the second water passage 323 are respectively connected to the main water passage 321, and the main water passage 321 is connected to the faucet water passage 11, which facilitates the arrangement of the water passages.

In some embodiments, as shown in FIGS. 1-3 and 6, the water inlet 211 includes a cold water inlet and a hot water inlet. The hot water inlet is connected to the hot water pipe through a connecting valve 5, and the cold water inlet is connected to the cold water pipe through another connecting valve 5. The valve core 22 may be an existing ceramic valve core, and the handle 23 can drive the valve core 22 to rotate to the left or right. The valve core 22 has ceramic chips for adjusting cold water and hot water. For the structure, construction and working principle of the ceramic valve core, please refer to the explanation of the ceramic valve in the prior art, which will not be repeated herein.

In some embodiments, the first water outlet 212 is kept in communication with the water inlet 211, and the valve core 22 controls the communication and the blocking between the second water outlet 213 and the water inlet 211.

In some embodiments, the first water outlet 212 is kept in communication with the water inlet 211 at all times, and the solenoid valve 33 is used to control the water supplied through the first water passage 322, which belongs to automatic control. The valve core 22 controls the communication and the blocking between the second water outlet 213 and the water inlet 211, and then controls the water supplied through the second water passage 323, which belongs to manual control.

If desired, the above technical solutions can be combined in order to achieve the best technical effect.

The above described is only the principle and the preferable embodiments of the present disclosure. It should be noted that for those of ordinary skills in the art, several other variations can be made on the basis of the principle of the present disclosure, which should also be regarded as falling into the scope of protection of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable).

Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the support structure as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein.

What is claimed is:

1. A sensing faucet assembly, comprising:
   a faucet body that includes a faucet water passage;
   an input water control unit that includes a water inlet, a first water outlet, and a second water outlet;
   a control box that includes a first water passage and a second water passage; and
   a sensor;
   wherein the first water passage communicates with the faucet water passage and the first water outlet, and a solenoid valve for controlling opening and closing of the first water passage is provided in the control box; and
   wherein the second water passage communicates with the faucet water passage and the second water outlet, and a valve core for controlling the opening and closing of the second water outlet is provided in the input water control unit.

2. The sensing faucet assembly according to claim 1, wherein:
   a filter screen is provided in the first water passage; and
   the filter screen is located between the solenoid valve and the first water outlet.

3. The sensing faucet assembly according to claim 1, wherein:
   the input water control unit comprises a control unit housing with a mounting cavity;
   the water inlet, the first water outlet and the second water outlet are provided on the control unit housing;
   the valve core is movably arranged in the mounting cavity and is configured to open and close the second water outlet;
   a handle for driving the valve core to move in the mounting cavity is arranged outside of the control unit housing; and
   the handle is connected with the valve core.

4. The sensing faucet assembly according to claim 3, wherein the faucet body includes a panel, and the sensor is installed on the panel.

5. The sensing faucet assembly according to claim 4, wherein the handle and the faucet body are located on the front side of the panel, and the control unit housing and the control box are located on the rear side of the panel.

6. The sensing faucet assembly according to claim 1, wherein the control box is equipped with a battery, and the battery is electrically connected to the solenoid valve.

7. The sensing faucet assembly according to claim 1, wherein:
   the control box includes a main water passage communicating with the faucet water passage; and
   the first water passage and the second water passage are communicated with the main water passage.

8. The sensing faucet assembly according to claim 1, wherein the water inlet includes a cold water inlet and a hot water inlet.

9. The sensing faucet assembly according to claim 1, wherein the first water outlet is in communication with the water inlet, and the valve core controls the communication and the blocking between the second water outlet and the water inlet.

* * * * *